United States Patent
Gao et al.

(10) Patent No.: US 11,569,894 B1
(45) Date of Patent: Jan. 31, 2023

(54) BLOCKAGE DETECTION FOR WIRELESS COMMUNICATIONS

(71) Applicant: QUALCOMM Incorporated, San Diego, CA (US)

(72) Inventors: Kang Gao, San Diego, CA (US); Jun Zhu, San Diego, CA (US); Alexei Yurievitch Gorokhov, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/518,038

(22) Filed: Nov. 3, 2021

(51) Int. Cl.
*H04B 7/08* (2006.01)
*H04B 17/309* (2015.01)

(52) U.S. Cl.
CPC ......... *H04B 7/0854* (2013.01); *H04B 7/0888* (2013.01); *H04B 17/309* (2015.01)

(58) Field of Classification Search
CPC ... H04B 7/0854; H04B 7/0888; H04B 17/309
See application file for complete search history.

(56) References Cited

U.S. PATENT DOCUMENTS

| 10,993,134 | B2 * | 4/2021 | Geng | H04W 48/20 |
| 2017/0346544 | A1 * | 11/2017 | Islam | H04B 7/0814 |
| 2019/0289519 | A1 * | 9/2019 | Guerreiro | H04W 72/046 |
| 2022/0287017 | A1 * | 9/2022 | Zhu | H04B 7/0617 |

FOREIGN PATENT DOCUMENTS

| WO | WO-9749198 A1 * | 12/1997 | H04B 17/309 |
| WO | WO-2019206061 A1 * | 10/2019 | H04B 17/309 |

OTHER PUBLICATIONS

Machine translation of WO-2019206061-A1. (Year: 2022).*

* cited by examiner

*Primary Examiner* — Jean B Corrielus
(74) *Attorney, Agent, or Firm* — Holland & Hart LLP

(57) ABSTRACT

Methods, systems, and devices for wireless communication are described. A user equipment (UE) may be configured with one or more parameters to support blockage detection for beamformed communication. The UE may receive a set of reference signals via a receive beam of a beam pair. The UE may detect a condition associated with a measured signal quality of a reference signal of the set of reference signals relative to a filtered signal quality of the set of reference signals. The condition may, in some examples, correspond to a drop of the measured signal quality at least a threshold amount below the filtered signal quality for at least a threshold duration of time. The UE may delete one or more signal quality values from a measurement database of the UE based on detecting the condition. The one or more signal quality values may be associated with the beam pair.

30 Claims, 11 Drawing Sheets

BLOCKAGE DETECTION FOR WIRELESS COMMUNICATIONS

FIELD OF TECHNOLOGY

The following relates to wireless communication, including blockage detection for wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE and a base station may communicate using beamforming techniques. The UE may receive reference signals from the base station using one or more beam pairs, which may include a base station beam and a UE beam used to transmit and receive the reference signals. The UE may measure a signal quality of the reference signals for each beam pair and apply a filter to two or more raw signal quality measurements. The UE may select a UE beam, a beam pair, or both to use for subsequent communications based on the filtered signal quality measurements for each beam pair.

SUMMARY

The described techniques relate to improved methods, systems, devices, and apparatuses that support blockage detection for wireless communications. Generally, the described techniques provide for a user equipment (UE) to support a configuration for improved blockage detection. The UE may be configured with one or more parameters for blockage detection, such as a threshold drop amount, a threshold duration of time, or both. The UE may receive one or more reference signals via a receive beam (which may be referred to as a UE beam) of a beam pair. The beam pair may be a serving beam pair for the UE that includes the receive beam and a transmit beam used by a base station in communication with the UE to transmit the reference signals (which may be referred to as a base station beam). The UE may measure a signal quality of the one or more reference signals over time and store the signal quality measurements in a measurement database of the UE. In some examples, the UE may perform filtering (e.g., averaging) over multiple measurements of the reference signals.

The UE may detect that a condition associated with the measured signal quality relative to the filtered signal quality is satisfied (e.g., that a measured signal quality of a reference signal (e.g., an instantaneous measurement) drops below the filtered signal quality level by at least a threshold amount for at least a threshold duration of time). In some examples, the condition may correspond to a physical obstruction, blockage, or other interference appearing between the UE and a device in communication with the UE. The UE may delete a history of one or more signal quality values associated with the serving beam pair and the filtered signal quality from the measurement database in response to detecting the condition. The UE may restart filtering after detecting the condition and deleting the history, which may improve the accuracy of subsequent filtered signal quality measurements, reduce a latency associated with beam reselection, or any combination thereof, among other possible benefits.

A method for wireless communication at a UE is described. The method may include receiving a set of multiple reference signals via a receive beam of a beam pair, detecting a condition associated with a measured signal quality of a reference signal of the set of multiple reference signals relative to a filtered signal quality of the set of multiple reference signals, and deleting, based on detecting the condition, one or more signal quality values associated with the beam pair and the filtered signal quality from a measurement database.

An apparatus for wireless communication is described. The apparatus may include memory, a transceiver, and at least one processor coupled with the memory and the transceiver. The at least one processor may be configured to cause the apparatus to receive, via the transceiver, a set of multiple reference signals via a receive beam of a beam pair, detect a condition associated with a measured signal quality of a reference signal of the set of multiple reference signals relative to a filtered signal quality of the set of multiple reference signals, and delete, based on detecting the condition, one or more signal quality values associated with the beam pair and the filtered signal quality from a measurement database.

Another apparatus for wireless communication at a UE is described. The apparatus may include means for receiving a set of multiple reference signals via a receive beam of a beam pair, means for detecting a condition associated with a measured signal quality of a reference signal of the set of multiple reference signals relative to a filtered signal quality of the set of multiple reference signals, and means for deleting, based on detecting the condition, one or more signal quality values associated with the beam pair and the filtered signal quality from a measurement database.

A non-transitory computer-readable medium storing code for wireless communication at a UE is described. The code may include instructions executable by a processor to receive a set of multiple reference signals via a receive beam of a beam pair, detect a condition associated with a measured signal quality of a reference signal of the set of multiple reference signals relative to a filtered signal quality of the set of multiple reference signals, and delete, based on detecting the condition, one or more signal quality values associated with the beam pair and the filtered signal quality from a measurement database.

In some examples of the method, apparatuses, and non-transitory computer-readable medium described herein, detecting the condition may include operations, features, means, or instructions for detecting that the measured signal quality may be at least a threshold amount below the filtered signal quality.

In some examples of the method, apparatuses, and non-transitory computer-readable medium described herein, detecting the condition may include operations, features, means, or instructions for detecting that the measured signal quality may be at least the threshold amount below the filtered signal quality for at least a threshold duration of time.

Some examples of the method, apparatuses, and non-transitory computer-readable medium described herein may further include operations, features, means, or instructions for performing a set of multiple measurements of the reference signal, where the threshold duration of time corresponds to a quantity of the set of multiple measurements.

Some examples of the method, apparatuses, and non-transitory computer-readable medium described herein may further include operations, features, means, or instructions for performing a set of multiple signal quality measurements prior to detecting the condition, where the one or more signal quality values may be based on the set of multiple signal quality measurements.

In some examples of the method, apparatuses, and non-transitory computer-readable medium described herein, the filtered signal quality may be based on the set of multiple signal quality measurements performed prior to detecting the condition.

In some examples of the method, apparatuses, and non-transitory computer-readable medium described herein, the set of multiple signal quality measurements may be associated with a set of multiple receive beams associated with the UE and a transmit beam associated with a device in communication with the UE, the transmit beam included in the beam pair, and the set of multiple receive beams including at least the receive beam of the beam pair.

In some examples of the method, apparatuses, and non-transitory computer-readable medium described herein, the set of multiple signal quality measurements may be associated with a set of multiple receive beams associated with the UE and a set of multiple transmit beams associated with a device in communication with the UE, the set of multiple receive beams including the receive beam of the beam pair, and the set of multiple transmit beams including a transmit beam of the beam pair.

In some examples of the method, apparatuses, and non-transitory computer-readable medium described herein, the beam pair includes the receive beam and a transmit beam associated with a device in communication with the UE and the method, apparatuses, and non-transitory computer-readable medium may include further operations, features, means, or instructions for selecting a second beam pair different than the beam pair for communications with the device based on deleting the one or more signal quality values, the second beam pair including the transmit beam and a second receive beam that may be different than the receive beam.

In some examples of the method, apparatuses, and non-transitory computer-readable medium described herein, the beam pair includes the receive beam and a transmit beam associated with a device in communication with the UE and the method, apparatuses, and non-transitory computer-readable medium may include further operations, features, means, or instructions for selecting a second beam pair different than the beam pair for communications with the device based on deleting the one or more signal quality values, the second beam pair including a second transmit beam that may be different than the transmit beam and a second receive beam that may be different than the receive beam.

In some examples of the method, apparatuses, and non-transitory computer-readable medium described herein, the measured signal quality and the filtered signal quality each correspond to a reference signal received power (RSRP) value.

Some examples of the method, apparatuses, and non-transitory computer-readable medium described herein may further include operations, features, means, or instructions for transmitting a signal quality measurement report based on resetting the history, the signal quality measurement report including an updated filtered signal quality based on one or more signal quality measurements performed after deleting the one or more signal quality values.

In some examples of the method, apparatuses, and non-transitory computer-readable medium described herein, the measured signal quality includes an instantaneous signal quality of the reference signal.

DETAILED DESCRIPTION

Figure 1:
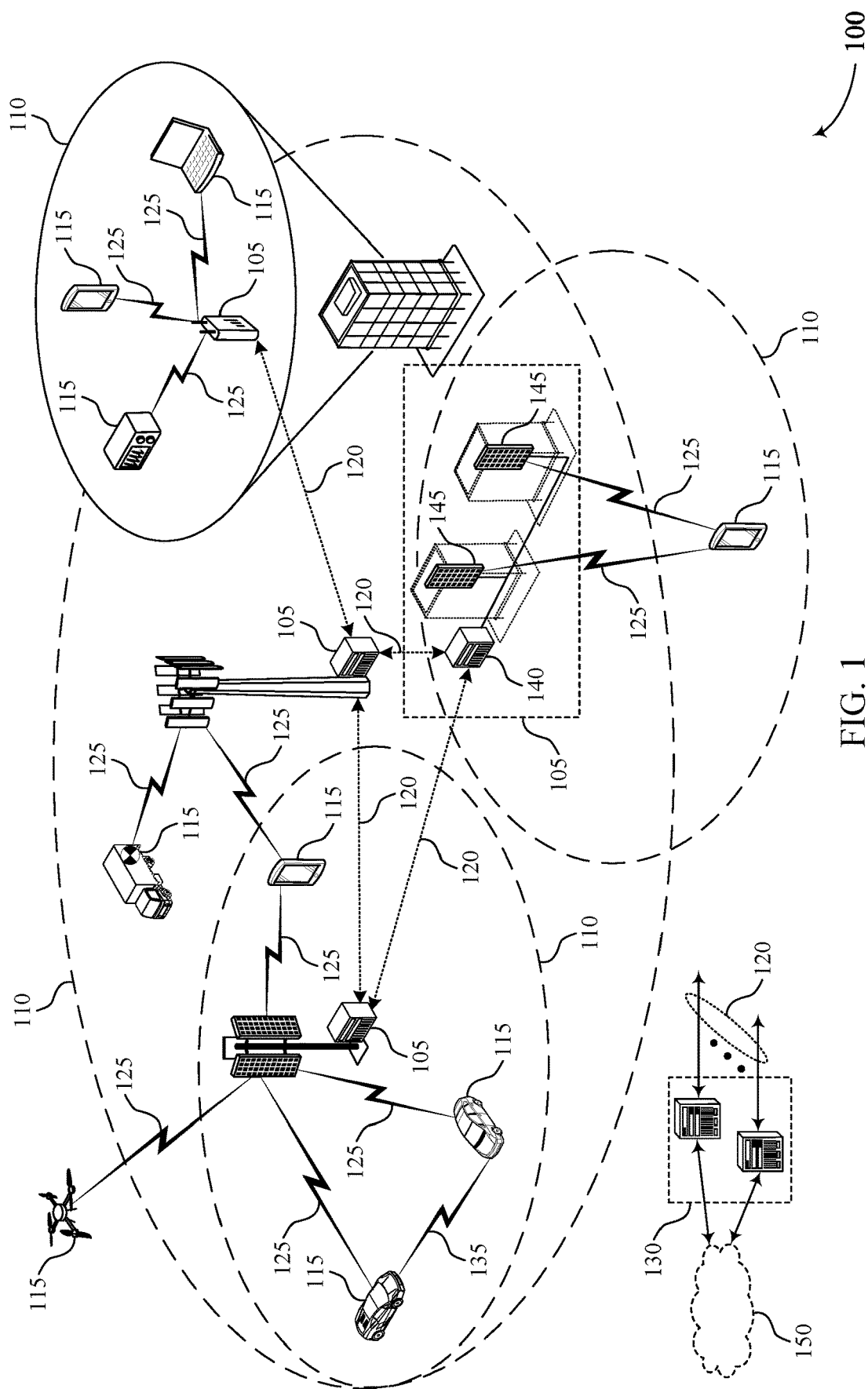
FIG. 1 illustrates an example of a wireless communications system that supports blockage detection for wireless communications in accordance with aspects of the present disclosure.

A wireless communications system may include communication devices, such as a base station (e.g., an eNodeB (eNB), a next generation NodeB or a giga NodeB, any of which may be referred to as a gNB, or some other base station) or a user equipment (UE) that may support multiple radio access technologies. Examples of radio access technologies include fourth generation (4G) systems such as Long Term Evolution (LTE) systems, and fifth generation (5G) systems which may be referred to as New Radio (NR) systems. In the wireless communications system, a UE may measure a signal quality of one or more downlink reference signals received from a base station or other device over time. The UE may perform filtering (e.g., averaging, smoothing, or any combination thereof) over multiple instantaneous signal quality measurements of the downlink reference signals to obtain a filtered signal quality, which may reduce the impact of noise associated with the instantaneous measurements. The UE may store historical measurements for different beam pairs (e.g., prior raw measurements, filtered values based on the prior raw measurements, or both) in a measurement database.

The UE may select a UE beam or a UE and base station beam pair from multiple sets of beam pairs associated with (e.g., supported by, able to be used by) the UE to use for future communications based on the filtered signal quality. For example, the UE may compare a filtered signal quality associated with a beam pair currently used for communication by the UE (which may be referred to as a serving beam pair) with one or more other filtered signal qualities associated with one or more other beam pairs supported by the UE. If a second filtered signal quality is greater than the filtered signal quality associated with the serving beam pair, the UE may determine to switch beams to improve throughput and communication reliability. In some examples, a UE beam may be referred to as a receive beam and a base station beam may be referred to as a transmit beam during downlink communications.

If a physical obstruction or other interference appears or is introduced between the UE and the base station in communication with the UE, the filtering of signal quality measurements may delay the UE's perception of a corresponding reduction in signal quality level. That is, due to higher signal quality having been measured before the blockage appeared (e.g., was introduced), the blockage may not be represented by the filtered signal quality level for at least a delay period. Thus, for example, the UE may not identify the blockage and may not determine to switch to a different beam pair for communication until after the delay period. As such, the filtering may increase latency of beam reselection or otherwise reduce reliability of communications.

Techniques described herein provide a configuration for a UE to detect and respond to a blockage. The UE may be configured with one or more parameters for detecting a blockage, such as a threshold drop (e.g., a drop of at least a threshold amount) in signal quality and a threshold time. If the UE identifies a drop of an instantaneous signal quality measurement, relative to an associated filtered signal quality (e.g., a signal quality based on two or more instantaneous signal quality measurements), of at least the threshold drop amount for at least the threshold time, the UE may determine that a condition of the instantaneous signal quality relative to the filtered signal quality is met. The UE may thus determine that a blockage has occurred (e.g., been introduced into a signal path). The threshold drop may correspond to a quantity of decibels (dBs) below the filtered signal quality, and the threshold time period may correspond to a quantity of measurements (e.g., if the measurements are performed periodically or otherwise in a manner such that a quantity of the measurements corresponds to a duration of time). When the condition is met, the UE may reset a history of signal quality measurements in the measurement database that were obtained prior to the condition being detected and restart filtering, such that the drop in signal quality may be identified by the UE without a delay period due to the filtering.

The UE may reset the history of signal quality measurements by deleting signal quality measurements associated with a serving beam pair currently used by the UE for communication from the measurement database. In some examples, the UE may additionally delete a history of filtered signal quality measurements associated with each beam pair supported by the UE that includes a same base station beam as the serving beam pair. Additionally or alternatively, in response to detecting the condition, the UE may delete a history of signal quality measurements associated with each beam pair supported by the UE from the measurement database. The UE may restart filtering after deleting the history of signal quality measurements, and the UE may select a new UE beam, a new beam pair, or both to use for subsequent communications based on the updated filtered signal quality. The updated signal filtered signal quality may be more accurate and representative of current operating conditions due to the deletion of the history of signal quality measurements (e.g., due to the deletion of signal quality measurements from before the blockage occurred), which may improve reliability of the beam selection process and improve communication throughput between the UE and the base station.

Aspects of the disclosure are initially described in the context of wireless communications systems. Additional aspects of the disclosure are described in the context of a signal quality measurement diagram and a process flow. Aspects of the disclosure are further illustrated by and described with reference to apparatus diagrams, system diagrams, and flowcharts that relate to blockage detection for wireless communications.

FIG. 1 illustrates an example of a wireless communications system 100 that supports blockage detection for wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may be configured to detect blockage during communication. For example, the UE 115 may be configured with one or more parameters for blockage detection, such as a threshold drop amount, a threshold duration of time, or both. The UE 115 may receive one or more reference signals via a receive beam (which may be referred to as a UE beam) of a beam pair. The beam pair may be a serving beam pair for the UE 115 that includes the receive beam and a transmit beam used by a base station 105 in communication with the UE 115 to transmit the reference signals. The UE 115 may measure a signal quality of the one or more reference signals over time and store the signal quality measurements in a measurement database of the UE 115. In some examples, the UE 115 may perform filtering (e.g., averaging) over multiple measurements of the reference signals. If the UE 115 detects that a measured signal quality of a reference signal (e.g., an instantaneous measurement) drops below the filtered signal quality level by at least a threshold amount for at least the threshold duration of time, the UE 115 may determine that a condition associated with the measured signal quality relative to the filtered signal quality is satisfied. In some examples, the condition may correspond to a physical obstruction, blockage, or other interference appearing between the UE 115 and the base station 105. The UE 115 may delete a history of one or more signal quality values associated with the serving beam pair and the filtered signal quality from the measurement database in response to detecting the condition. The UE 115 may restart filtering after detecting the condition and deleting the history, which may provide for more accurate filtered signal quality measurements.

Figure 2:
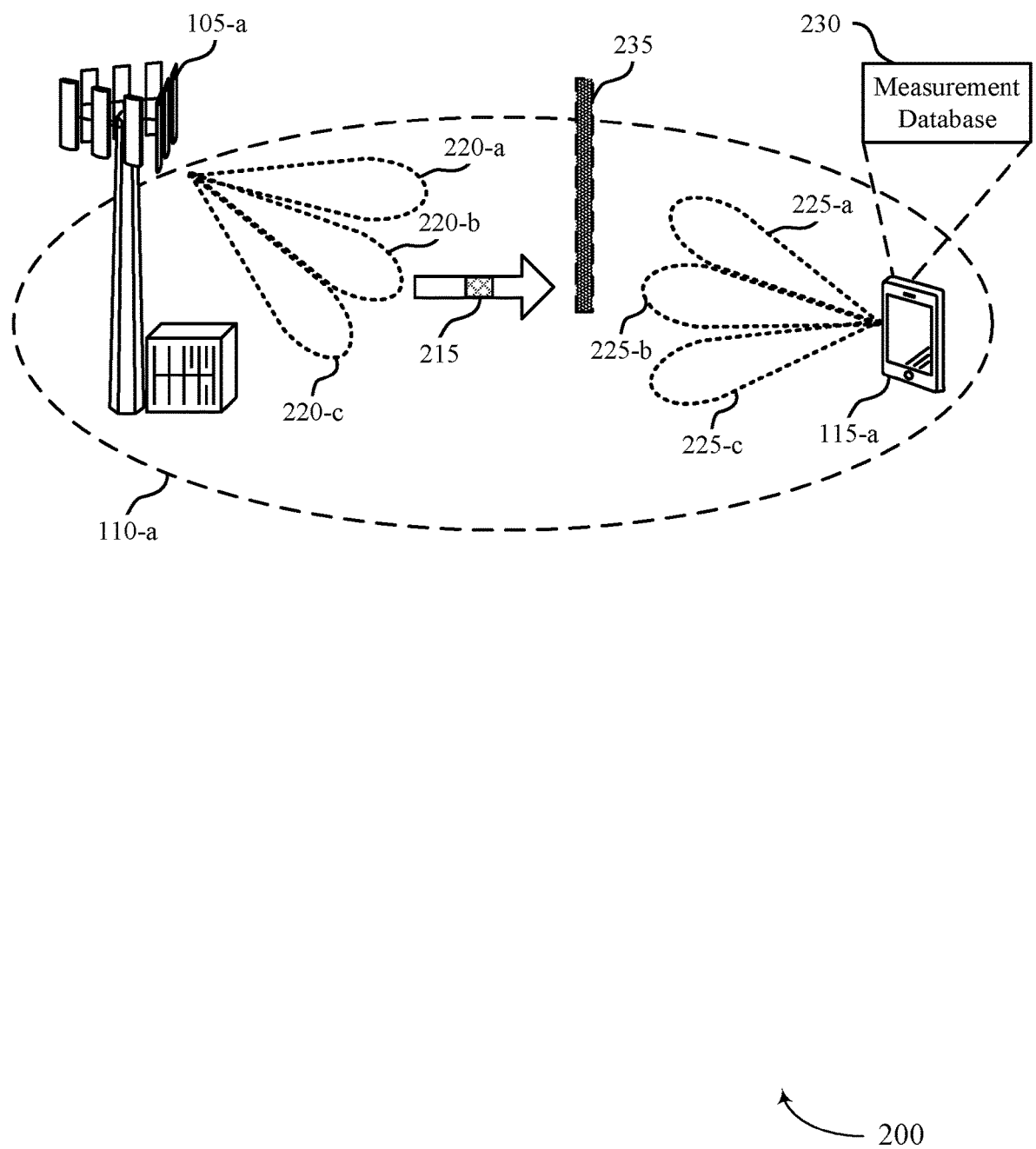
FIG. 2 illustrates an example of a wireless communications system that supports blockage detection for wireless communications in accordance with aspects of the present disclosure.

FIG. 2 illustrates an example of a wireless communications system 200 that supports blockage detection for wireless communications in accordance with aspects of the present disclosure. The wireless communications system 200 may implement aspects of the wireless communications system 100 or may be implemented by aspects of the wireless communications system 100. For example, the wireless communications system 200 may include a base station 105-a and a UE 115-a, which may represent examples of a base station 105 and a UE 115 as described with reference to FIG. 1. The base station 105-a may communicate with the UE 115-a within a geographic coverage area 110-a.

The wireless communications system 200 may support beamformed communications. For example, the base station 105-a may communicate with the UE 115-a using one or more base station beams 220 (e.g., base station beams 220-a, 220-b, and 220-c), and the UE 115-a may communicate with the base station 105-a using one or more UE beams 225 (e.g., UE beams 225-a, 225-b, and 225-c). A combination of a UE beam 225 and a base station beam 220 concurrently used for a wireless communication may be referred to as a beam pair. For example, the UE beam 225-b and the base station beam 220-b may be a beam pair used for communication of one or more reference signals 215. A beam pair currently being used for communication by the UE 115-a may be referred to as a serving beam pair.

The UE 115-a may, in some cases, measure a signal quality of one or more downlink reference signals 215 received via each beam pair over time. The signal quality measurements may include reference signal received power (RSRP) measurements, reference signal received quality (RSRQ) measurements, or some other signal quality measurements. The UE 115-a may receive the one or more reference signals 215 from the base station 105-a using one or more beam pairs. For example, the base station 105-a may transmit the reference signals 215 using any one or more of the base station beams 220-a, 220-b, and 220-c, and the UE 115-a may receive the reference signals 215 using any one or more of the UE beams 225-a, 225-b, and 225-c, where each combination of a base station beam 220 and a UE beam 225 may represent a respective beam pair.

The UE 115-a may measure the signal quality of the reference signals 215 and store the measurements in a measurement database 230 of the UE 115-a. The measurement database 230 may be circuitry within the UE 115-a that is configured to store data. The signal quality measurements may be grouped and indexed within the measurement database 230 according to a corresponding beam pair. For example, a first set of measurements having a first index in the measurement database 230 may correspond to measurements of reference signals 215 transmitted and received using a first beam pair including, for example, the UE beam 225-b and the base station beam 220-b, and a second set of measurements having a second index in the measurement database 230 may correspond to measurements of reference signals transmitted and received using a second beam pair including, for example, the UE beam 225-b and the base station beam 220-c, or some other combination of beams.

The signal quality measurements obtained by the UE 115-a for each reference signal 215 may be referred to as raw or instantaneous signal quality measurements and may be associated with relatively significant noise (e.g., values of the measurements may vary over time). To reduce noise and improve a reliability of the signal quality measurements, the UE 115-a may apply a filter to the measurements. The filtering may include averaging the measurements over time, or applying some other filter, to reduce noise and obtain a more stable measurement. The UE 115-a may store the filtered values, prior raw measurements, or both, for each beam pair in the measurement database 230. In some examples, the UE 115-a may perform filtering based on a history of raw measurements stored in the measurement database 230. For example, the UE 115-a may periodically filter a set of raw measurements (e.g., every 10 samples, or some other quantity or time period). Additionally or alternatively, the UE 115-a may store a single filtered value for each beam pair, and the filtered signal quality value may be dynamically updated to compensate for each new measurement.

The UE 115-a may use the filtered signal qualities to select a beam pair to use for subsequent communications with the base station 105-a. For example, the UE 115-a may communicate with the base station 105-a using a serving beam pair including the UE beam 225-b and the base station beam 220-b. The UE 115-a may compare a filtered signal quality associated with the serving beam pair with one or more other filtered signal qualities associated with other beam pairs associated with (e.g., supported by, able to be used by) the UE 115-a. The other beam pairs may include a different base station beam 220 than the serving beam pair, a different UE beam 225 than the serving beam pair, or both.

The one or more other filtered signal qualities may be stored in the measurement database 230 and may, for example, correspond to filtered measurements previously obtained by the UE 115-a using the other beam pairs. Such signal qualities may be referred to as historical measurements. If the filtered signal quality of the serving beam pair is less than a filtered signal quality of another beam pair, the UE 115-a may determine to switch to using the other beam pair for subsequent communications to improve throughput and communication reliability.

In some examples, a physical obstruction 235 or other interference may appear between the UE 115-a and the base station 105-a during communications (e.g., a sudden introduction of interference). The obstruction 235 or other interference may be referred to as a blockage herein. In such cases, the filtering of the signal quality measurements may delay a perception of a corresponding reduction in signal quality level by the UE 115-a. That is, after a blockage appears, the filtered signal quality may be relatively high for a duration, such that the UE 115-a may not identify a drop in signal quality due to the blockage. The delay may be due to the filtering (e.g., averaging) of an instantaneous signal quality measurement after the obstruction 235 appeared (e.g., was introduced) with one or more previous signal quality measurements obtained before the obstruction 235 appeared (e.g., stale measurements). The previous signal quality measurements may be greater than the one or more raw measurements obtained after the blockage appeared, which may increase the filtered signal quality level.

The delay in identifying the blockage may increase latency of beam selection (e.g., or reselection) and reduce a reliability of communications by the UE 115-a. For example, if the UE 115-a does not identify the blockage for at least a delay period, the UE 115-a will continue to communicate with the base station 105-a for the delay period using a same serving beam pair that is affected by the blockage. For example, the filtered signal quality associated with the serving beam pair may continue to be greater than other filtered signal qualities associated with other beam pairs that may not be affected by the blockage for the delay period, such that the UE 115-a may determine to refrain from switching to a different beam pair. The communications using the serving beam pair during the delay period may be inaccurate or delayed due to the obstruction 235, which may reduce throughput and communication reliability.

To improve reliability and reduce latency, the UE 115-a as described herein may be configured with one or more parameters for detecting a blockage. The parameters may include a threshold drop in signal quality and a threshold duration. If the UE 115-a detects a condition associated with an instantaneous signal quality measurement of a reference signal 215 of a set of multiple reference signals 215 relative to a filtered signal quality of the set of multiple reference signals 215 (e.g., a signal quality based on two or more instantaneous signal quality measurements), the UE 115-a will respond to the blockage. In some examples, the UE 115-a may set a blockage detection flag (e.g., set blockage detection to be true).

Detecting the condition may include detecting, by the UE 115-a, that the measured signal quality (e.g., one or more raw or instantaneous signal quality measurements) is at least the threshold drop below the filtered signal quality. Additionally or alternatively, the UE 115-a may detect the condition if the measured signal quality is at least the threshold drop below the filtered signal quality for at least the threshold duration of time. In some examples, the threshold drop may correspond to a quantity of dBs, or some other signal quality units, below the filtered signal quality, and the threshold duration may correspond to a quantity of samples or measurements (e.g., if the measurements are performed periodically or otherwise in a manner such that a quantity of the measurements corresponds to a duration of time), or some other duration of time.

If the UE 115-a detects the condition, the UE 115-a will respond to the blockage by deleting a history of signal quality values associated with at least the serving beam pair from the measurement database 230. For example, if the serving beam pair includes the UE beam 225-b and the base station beam 220-b and the UE 115-a detects the condition associated with the serving beam pair, the UE 115-a will delete a history of signal quality measurements associated with the serving beam pair that are stored in the measurement database 230. The UE 115-a may restart filtering after deleting the history, such that the filtering may more accurately represent the signal quality levels after the blockage appears. After resetting the history, the UE 115-a may compare the updated filtered signal quality of the serving beam pair with other filtered signal qualities of other beam pairs supported by the UE 115-a and select a beam pair with the highest filtered signal quality to use for subsequent communications.

One or more other beam pairs supported by the UE 115-a may include the same base station beam 220 as the serving beam pair, such as the base station beam 220-b. In some cases, a filtered signal quality of the other beam pairs that include the same base station beam 220-b may not represent the blockage. For example, a history of signal quality measurements of the other beam pairs including the base station beam 220-b may be relatively high, such that an instantaneous reduction in signal quality due to introduction of the blockage may not be represented by the filtered signal quality. In such cases, to improve the beam pair selection process, the UE 115-a may delete a history of signal quality values associated with each beam pair that includes the same base station beam 220-b as the serving beam pair from the measurement database 230. The UE 115-a may restart filtering for each beam pair that includes the same base station beam 220-b after detecting the condition and resetting the history, such that the filtered signal quality for each of the beam pairs may represent the blockage. The UE 115-a may use the updated filtered signal qualities to select a beam pair for communication. In some examples, the UE 115-a may perform similar blockage detection techniques for each base station beam 220.

Additionally or alternatively, the UE 115-a may, in some examples, delete every historical signal quality measurement from the measurement database 230 and restart filtering for each beam pair in response to detecting the blockage. For example, if the UE 115-a is configured to support blockage detection for a single base station beam 220, the UE 115-a may be configured to improve the beam pair selection process by deleting a history of signal quality values associated with each beam pair supported by the UE 115-a from the measurement database 230. The UE 115-a may select a new beam pair based on the filtered signal qualities for each beam pair after resetting the history and restarting filtering.

A communication link or channel associated with the new beam pair selected by the UE 115-a may not be affected by the blockage, or may be less affected by the blockage than a communication link or channel associated with the previous serving beam pair used by the UE 115-a. In the example of FIG. 2, the beam pair including the base station beam 220-c and the UE beam 225-c may be less affected by the physical obstruction 235 than the serving beam pair including the base station beam 220-b and the UE beam 225-b. By selecting the new beam pair, the UE 115-a may improve throughput and reliability of communications between the UE 115-a and the base station 105-a.

The UE 115-a may transmit a signal quality measurement report (e.g., an RSRP report) to the base station 105-a to indicate the signal quality measurements. The UE 115-a may transmit the signal quality measurement report to the base station 105-a dynamically or semi-statically. The signal quality measurement report may indicate all of the data or a subset of the data stored in the measurement database 230. In some examples, the signal quality measurement report may indicate a filtered signal quality for each beam pair used by the UE 115-a and the base station 105-a for communications. The UE 115-a may transmit the signal quality measurement report after detecting the blockage and resetting the history of signal quality values in the measurement database 230. In such cases, the signal quality measurement report may indicate, to the base station 105-a, an updated filtered signal quality level for the serving beam pair, one or more other beam pairs, or both. The base station 105-a may use the updated filtered signal quality levels for beam selection or adjustment.

The blockage detection techniques described herein may thereby provide for the UE 115-a to identify when a blockage has appeared and respond to the blockage quicker than if the UE 115-a is not configured with the described blockage detection configuration. The described blockage detection techniques may reduce latency of a beam selection procedure, improve throughput, and improve a reliability of the communications by the UE 115-a.

Figure 3:
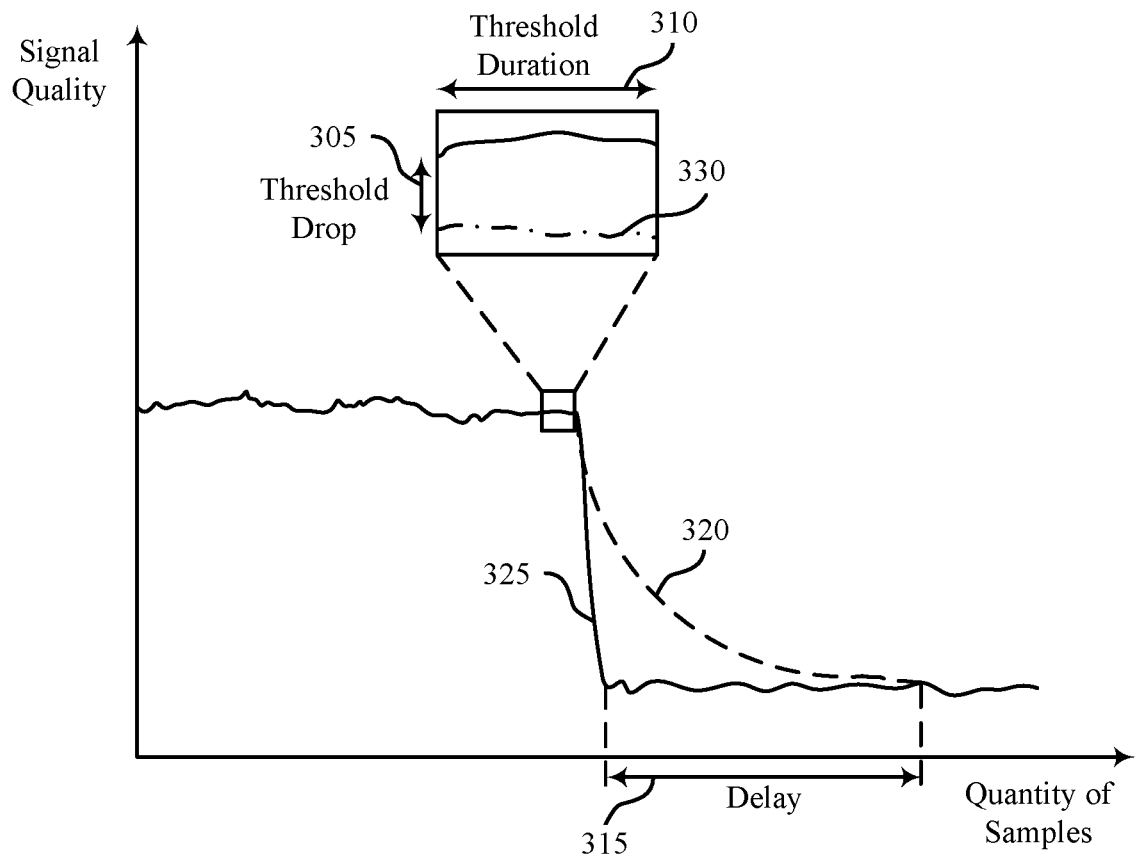
FIG. 3 illustrates an example of a signal quality measurement diagram that supports blockage detection for wireless communications in accordance with aspects of the present disclosure.

FIG. 3 illustrates an example of a signal quality measurement diagram 300 that supports blockage detection for wireless communications in accordance with aspects of the present disclosure. The signal quality measurement diagram 300 may implement or be implemented by aspects of the wireless communications systems 100 and 200. For example, the signal quality measurement diagram may illustrate signal quality measurements performed by a UE 115, which may represent an example of a UE 115 as described with reference to FIGS. 1 and 2. The UE 115 may perform the signal quality measurements on a set of one or more reference signals received from a base station or some other device, as described with reference to FIG. 2. In some examples, the UE 115 may store the measurements in a measurement database of the UE 115.

The signal quality measurement diagram 300 illustrates filtered signal quality measurements by the UE 115 using a serving beam pair. The y-axis may represent signal quality measurement levels in dBs (e.g., or dB milliwatts (dBm)) increasing from bottom to top. The x-axis may represent a quantity of samples obtained by the UE 115, increasing from left to right. The quantity of samples may correspond to a quantity of measurements performed by the UE 115 over time.

The curve 320 may represent an example trajectory of filtered signal quality levels over time if a blockage is introduced and the UE 115 does not support blockage detection. The curve 325 may represent an example trajectory of filtered signal quality levels over time if a blockage is introduced and the UE 115 supports blockage detection as described herein. The curve 330 may represent an example subset of instantaneous or raw signal quality measurements obtained by the UE 115. Each of the curves 320, 325, and 330 may correspond to signal quality associated with one or more reference signals transmitted and received using a same serving beam pair. The UE 115 may obtain one or more samples, or measurements, of each reference signal. In some examples, the curves 320, 325, and 330 may correspond to samples associated with a same reference signal, or with multiple reference signals. The UE 115 may store the measurements associated with the curve 320, the curve 325, the curve 330, or any combination thereof in a measurement database of the UE 115.

The UE 115 may obtain a raw signal quality measurement of a reference signal for each sample. However, the raw signal quality measurements may be associated with relatively large amounts of noise. For example, the signal quality levels of the curve 330 may vary for each sample, such that the curve 330 may appear to be oscillating randomly. Thus, the full curve 330 over each sample is not illustrated in FIG. 3 for clarity purposes. The filtered signal quality measurements may represent more stable signal quality levels due to filtering (e.g., averaging) of two or more instantaneous signal quality measurements to reduce noise.

If a blockage appears between the UE 115 and a device in communication with the UE 115 (e.g., an introduction of a physical obstruction or other interference) and the UE 115 does not support blockage detection, previous signal quality measurements obtained before the blockage appeared may elevate the filtered signal quality, such that the filtered signal quality may not represent the blockage. In such cases, the filtered signal quality may respond to the blockage over a delay period 315, as illustrated by the curve 320. The delay period 315 may correspond to a quantity of samples or measurements obtained after the blockage appeared before the filtered signal quality is reduced to a level that is representative of the blockage. The UE 115 may use the filtered signal quality values to identify a beam pair to use for subsequent communications, as described with reference to FIG. 2. As such, if the UE 115 is not configured to support blockage detection, the UE 115 may not identify a new beam pair to use until after the delay period 315, which may increase latency, reduce throughput, and reduce communication reliability.

To reduce latency and improve communication reliability, the UE 115 may be configured with one or more parameters to support blockage detection. As illustrated in FIG. 3, the filtered signal quality without blockage detection may be the same as the filtered signal quality with blockage detection before the blockage is detected. However, if the UE 115 detects a condition of the measured signal quality (e.g., the raw signal quality measurements) relative to the filtered signal quality and the UE 115 is configured to support blockage detection, the UE 115 will respond to the blockage. The condition may correspond to a drop of a raw signal quality measurement by at least a threshold drop 305 below the filtered signal quality for at least the threshold duration 310. Such a condition is illustrated by the subset of raw signal quality measurement associated with the curve 330. The threshold drop 305 and the threshold duration 310 may be included in the one or more parameters configured for the UE 115. The parameters may be configured at the UE 115 or may be indicated to the UE 115 via control signaling. The threshold drop 305 may correspond to a quantity of dBs below the filtered signal quality (e.g., X dB) and the threshold duration 310 may correspond to a quantity of measurements or samples at a same serving beam (e.g., N measurements).

The UE 115 may store the raw signal quality measurements corresponding to the curve 330 in a measurement database of the UE 115. The UE 115 may compare the measured signal quality with the filtered signal quality at each measurement continuously or periodically (e.g., every N measurements). By storing at least N samples of the raw signal quality in the measurement database, the UE 115 may identify when the condition is satisfied.

The UE 115 may respond to the detected blockage by deleting a history of signal quality measurements associated with the serving beam pair from the measurement database. In some examples, the UE 115 may additionally delete a history of signal quality measurements associated with one or more other beam pairs that include a same base station beam as the serving beam pair, or the UE may delete a history of signal quality measurements associated with each beam pair supported by the UE 115, as described in further detail with reference to FIG. 2. The history of signal quality measurements may correspond to values obtained by the UE 115 prior to detecting the condition (e.g., a history of signal quality values in the measurement database), which may be referred to as stale measurements.

The UE 115 may restart filtering after resetting the history, such that the filtered signal quality with blockage detection may be an average of two or more instantaneous measurements obtained by the UE 115 after the blockage has appeared. The updated filtered signal quality may represent the blockage more accurately than the filtered signal quality without blockage detection (e.g., without resetting the history of signal quality measurements). The differences in filtered signal qualities with and without blockage detection are illustrated by the differences in the curves 325 and 320, respectively, during the delay period 315. The curve 325 may drop to a stable level representative of a signal quality of a communication link that is affected by a blockage relatively quickly, and the curve 320 may not drop to a stable level for at least the delay period 315.

The UE 115 may compare the filtered signal quality of the serving beam pair with other filtered signal qualities for other beam pairs supported by the UE 115. The relatively quick drop in the filtered signal quality with blockage detection may thereby provide for the UE 115 to identify another beam pair that corresponds to a higher filtered signal quality than the current serving beam pair. In some examples, the different beam pair may not be affected by the blockage, or the blockage may affect the different beam pair less than the current beam pair used by the UE 115. The UE 115 may switch to the different beam pair to achieve the higher signal quality, which may provide for reduced latency and improved communication reliability.

By performing blockage detection as described herein, the UE 115 may thereby restart filtering and identify a new beam pair to use for communication based on the updated filtered signal quality faster than if the UE 115 does not perform blockage detection.

Figure 4:
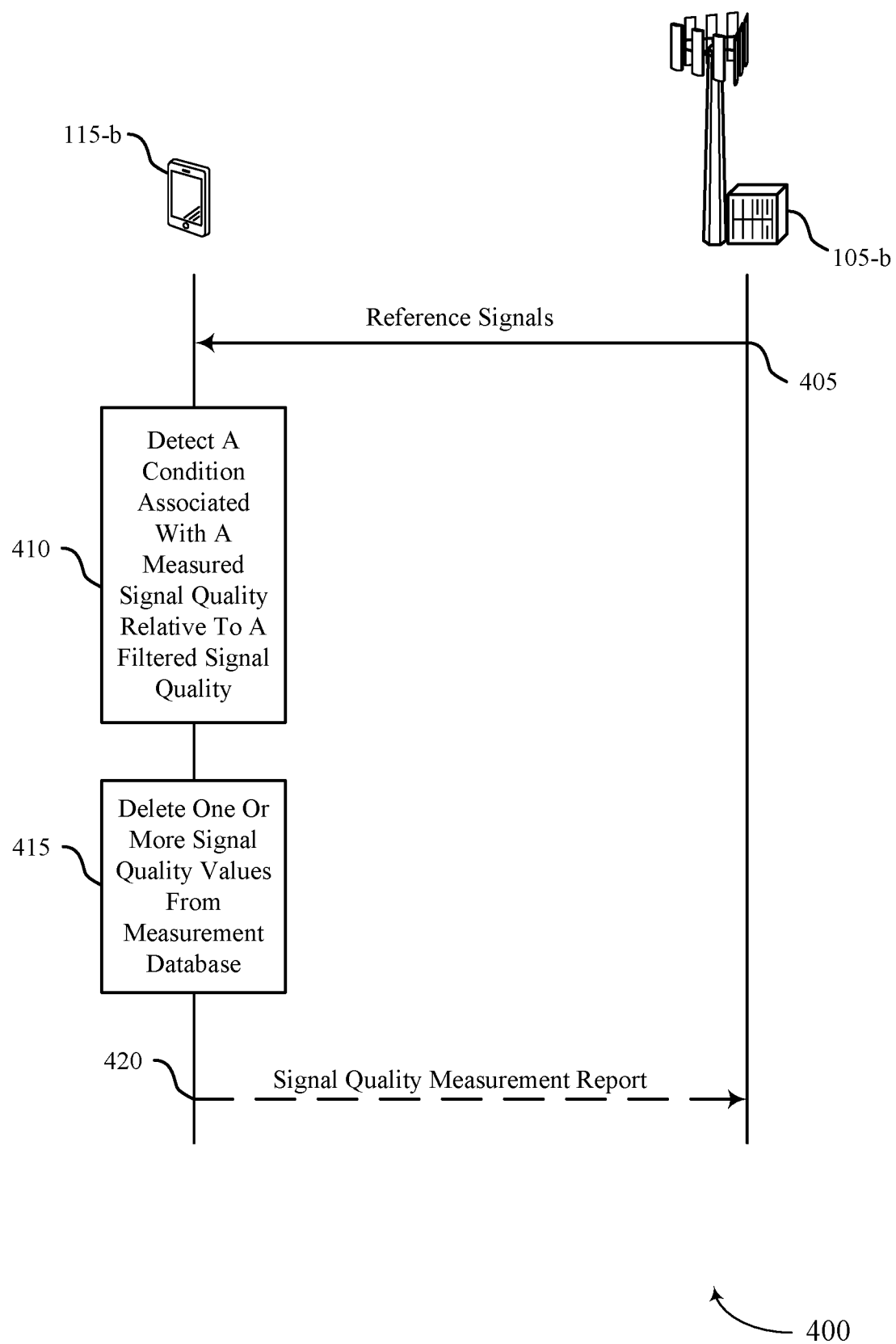
FIG. 4 illustrates an example of a process flow that supports blockage detection for wireless communications in accordance with aspects of the present disclosure.

FIG. 4 illustrates an example of a process flow 400 that supports blockage detection for wireless communications in accordance with aspects of the present disclosure. The process flow 400 may implement or be implemented by aspects of the wireless communications systems 100 and 200. For example, the process flow 400 may illustrate techniques for blockage detection by a UE 115-*b* in communication with a base station 105-*b*, which may represent examples of a base station 105 and a UE 115 as described with reference to FIGS. 1 through 3.

In the following description of the process flow 400, the operations between the base station 105-*b* and the UE 115-*b* may be performed in different orders or at different times. For example, certain operations may be left out of the process flow 400, or other operations may be added. Although the base station 105-*b* and the UE 115-*b* are shown performing the operations of the process flow 400, some aspects of some operations may also be performed by one or more other wireless devices.

At 405, the base station 105-*b* may transmit a set of reference signals to the UE 115-*b*. The base station 105-*b* may transmit the set of reference signals via a transmit beam (e.g., a base station beam) and the UE 115-*b* may receive the set of reference signals via a receive beam (e.g., a UE beam). The transmit beam and the receive beam may correspond to a beam pair. The UE 115-*b* may measure a signal quality level of each reference signal of the set of reference signals and may store the measurements in a measurement database of the UE 115-*b*. In some examples, the UE 115-*b* may filter (e.g., average) two or more of the signal quality measurements and store the filtered signal quality in the measurement database.

At 410, the UE 115-*b* may detect a condition associated with a measured signal quality of a reference signal of the set of reference signals relative to a filtered signal quality of the set of reference signals. In some examples, detecting the condition may include detecting that the measured signal quality is at least a threshold amount below the filtered signal quality. Detecting the condition may, in some examples, include detecting that the measured signal quality is at least the threshold amount below the filtered signal quality for at least a threshold duration of time. The UE 115 may perform a set of one or more measurements of the reference signal and the threshold duration of time may correspond to a quantity of the set of measurements.

At 415, the UE 115-*b* may delete one or more signal quality values associated with the beam pair and the filtered signal quality from the measurement database based on detecting the condition. The one or more signal quality values may correspond to a set of signal quality measurements performed prior to detecting the condition.

At 420, in some examples, the UE 115-*b* may transmit a signal quality measurement report to the base station 105-*b* based on deleting the one or more signal quality values. The signal quality measurement report may include an updated filtered signal quality based on one or more signal quality measurements performed after deleting the one or more signal quality values.

Figure 5:
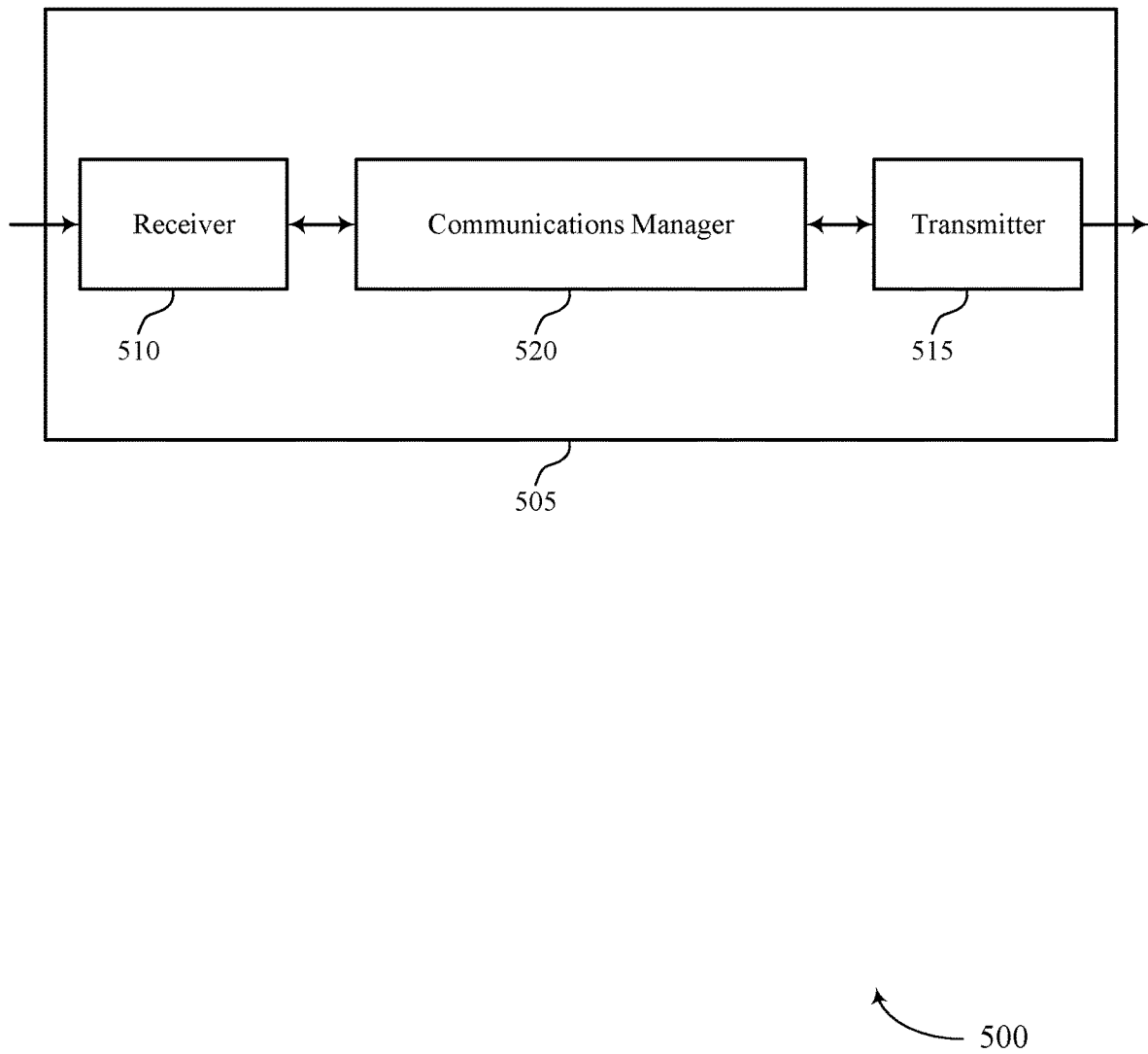
FIGS. 5 and 6 show block diagrams of devices that support blockage detection for wireless communications in accordance with aspects of the present disclosure.

FIG. 5 shows a block diagram 500 of a device 505 that supports blockage detection for wireless communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to blockage detection for wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to blockage detection for wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of blockage detection for wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving a set of multiple reference signals via a receive beam of a beam pair. The communications manager 520 may be configured as or otherwise support a means for detecting a condition associated with a measured signal quality of a reference signal of the set of multiple reference signals relative to a filtered signal quality of the set of multiple reference signals. The communications manager 520 may be configured as or otherwise support a means for deleting, based on detecting the condition, one or more signal quality values associated with the beam pair and the filtered signal quality from a measurement database.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, and reduced latency. The device 505 may be configured with one or more parameters, including a threshold drop and a threshold duration parameter for blockage detection. The processor of the device 505 may use the one or more parameters to detect a blockage faster than if the processor does not use the parameters, which may reduce processing and latency. For example, if the processor detects a drop in a measured or instantaneous signal quality of a reference signal that is at least the threshold amount below a filtered signal quality for at least the threshold duration, the processor may determine a blockage has appeared. The processor may reset a history of measurements in a measurement database and use the reset values to select a new beam pair for communications, which may provide for the processor to select a new beam pair relatively quickly. The processor may thereby reduce power consumption and processing by switching beam pairs to perform more accurate and reliable communications.

Figure 6:
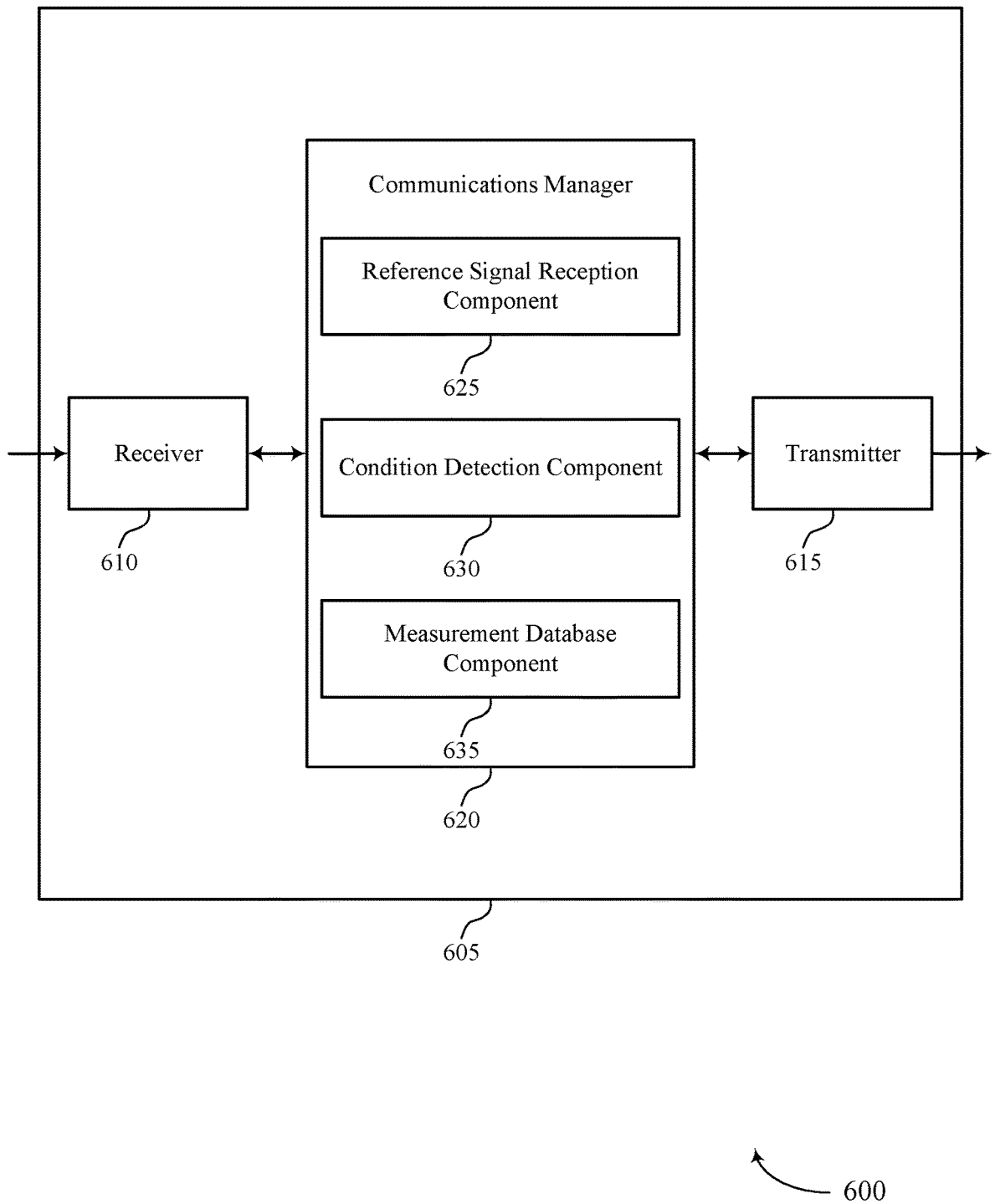

FIG. 6 shows a block diagram 600 of a device 605 that supports blockage detection for wireless communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to blockage detection for wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to blockage detection for wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of blockage detection for wireless communications as described herein. For example, the communications manager 620 may include a reference signal reception component 625, a condition detection component 630, a measurement database component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The reference signal reception component 625 may be configured as or otherwise support a means for receiving a set of multiple reference signals via a receive beam of a beam pair. The condition detection component 630 may be configured as or otherwise support a means for detecting a condition associated with a measured signal quality of a reference signal of the set of multiple reference signals relative to a filtered signal quality of the set of multiple reference signals. The measurement database component 635 may be configured as or otherwise support a means for deleting, based on detecting the condition, one or more signal quality values associated with the beam pair and the filtered signal quality from a measurement database.

Figure 7:
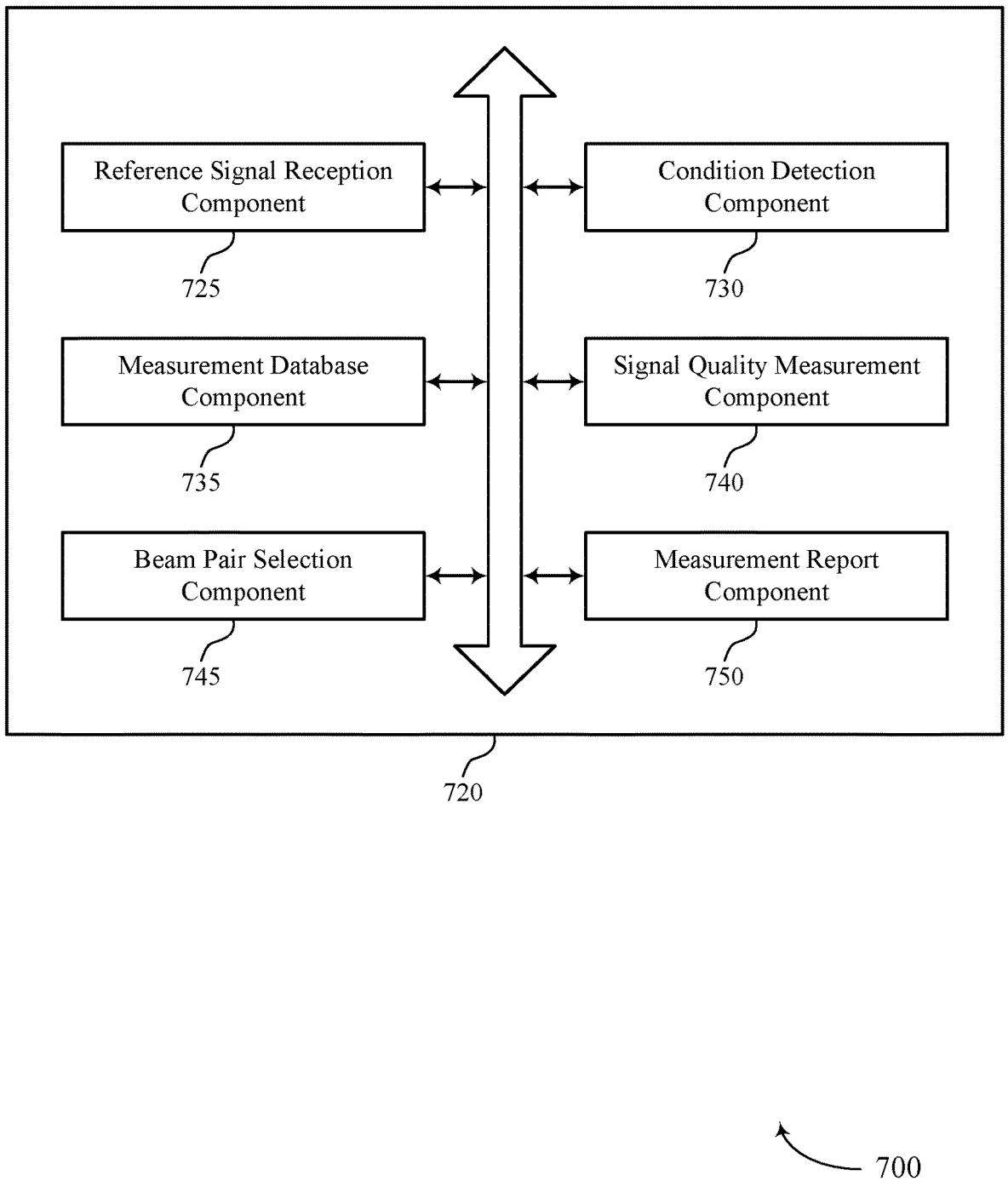
FIG. 7 shows a block diagram of a communications manager that supports blockage detection for wireless communications in accordance with aspects of the present disclosure.

FIG. 7 shows a block diagram 700 of a communications manager 720 that supports blockage detection for wireless communications in accordance with aspects of the present disclosure. The communications manager 720 may be an example of aspects of a communications manager 520, a communications manager 620, or both, as described herein. The communications manager 720, or various components thereof, may be an example of means for performing various aspects of blockage detection for wireless communications as described herein. For example, the communications manager 720 may include a reference signal reception component 725, a condition detection component 730, a measurement database component 735, a signal quality measurement component 740, a beam pair selection component 745, a measurement report component 750, or any combination thereof. Each of these components may communicate, directly or indirectly, with one another (e.g., via one or more buses).

The communications manager 720 may support wireless communication at a UE in accordance with examples as disclosed herein. The reference signal reception component 725 may be configured as or otherwise support a means for receiving a set of multiple reference signals via a receive beam of a beam pair. The condition detection component 730 may be configured as or otherwise support a means for detecting a condition associated with a measured signal quality of a reference signal of the set of multiple reference signals relative to a filtered signal quality of the set of multiple reference signals. The measurement database component 735 may be configured as or otherwise support a means for deleting, based on detecting the condition, one or more signal quality values associated with the beam pair and the filtered signal quality from a measurement database.

In some examples, to support detecting the condition, the condition detection component 730 may be configured as or otherwise support a means for detecting that the measured signal quality is at least a threshold amount below the filtered signal quality.

In some examples, to support detecting the condition, the condition detection component 730 may be configured as or otherwise support a means for detecting that the measured signal quality is at least the threshold amount below the filtered signal quality for at least a threshold duration of time. In some examples, the signal quality measurement component 740 may be configured as or otherwise support a means for performing a set of multiple measurements of the reference signal, where the threshold duration of time corresponds to a quantity of the set of multiple measurements.

In some examples, the signal quality measurement component 740 may be configured as or otherwise support a means for performing a set of multiple signal quality measurements prior to detecting the condition, where the one or more signal quality values are based on the set of multiple signal quality measurements. In some examples, the filtered signal quality is based on the set of multiple signal quality measurements performed prior to detecting the condition.

In some examples, the set of multiple signal quality measurements is associated with a set of multiple receive beams associated with (e.g., supported by, able to be used by) the UE and a transmit beam associated with (e.g., supported by, able to be used by) a device in communication with the UE, the transmit beam included in the beam pair, and the set of multiple receive beams including at least the receive beam of the beam pair. In some examples, the set of multiple signal quality measurements is associated with a set of multiple receive beams associated with the UE and a set of multiple transmit beams associated with a device in communication with the UE, the set of multiple receive beams including the receive beam of the beam pair, and the set of multiple transmit beams including a transmit beam of the beam pair.

In some examples, the beam pair includes the receive beam and a transmit beam associated with a device in communication with the UE, and the beam pair selection component 745 may be configured as or otherwise support a means for selecting a second beam pair different than the beam pair for communications with the device based on deleting the one or more signal quality values, the second beam pair including the transmit beam and a second receive beam that is different than the receive beam.

In some examples, the beam pair includes the receive beam and a transmit beam associated with a device in communication with the UE, and the beam pair selection component 745 may be configured as or otherwise support a means for selecting a second beam pair different than the beam pair for communications with the device based on deleting the one or more signal quality values, the second beam pair including a second transmit beam that is different than the transmit beam and a second receive beam that is different than the receive beam.

In some examples, the measurement report component 750 may be configured as or otherwise support a means for transmitting a signal quality measurement report based on deleting the one or more signal quality values, the signal quality measurement report including an updated filtered signal quality based on one or more signal quality measurements performed after deleting the one or more signal quality values.

In some examples, the measured signal quality and the filtered signal quality each correspond to an RSRP value. In some examples, the measured signal quality includes an instantaneous signal quality of the reference signal.

Figure 8:
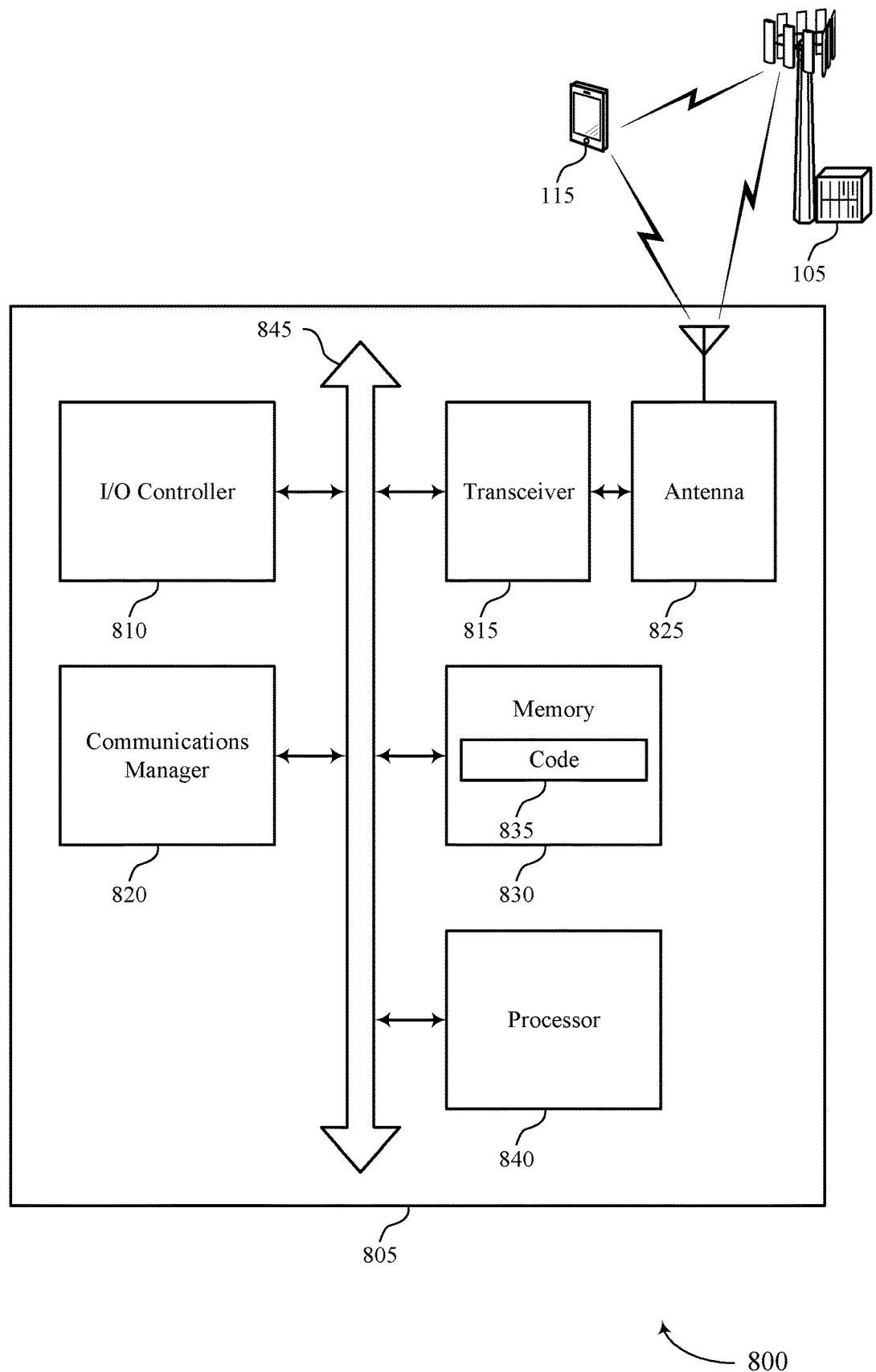
FIG. 8 shows a diagram of a system including a device that supports blockage detection for wireless communications in accordance with aspects of the present disclosure.

FIG. 8 shows a diagram of a system 800 including a device 805 that supports blockage detection for wireless communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting blockage detection for wireless communications). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving a set of multiple reference signals via a receive beam of a beam pair. The communications manager 820 may be configured as or otherwise support a means for detecting a condition associated with a measured signal quality of a reference signal of the set of multiple reference signals relative to a filtered signal quality of the set of multiple reference signals. The communications manager 820 may be configured as or otherwise support a means for deleting, based on detecting the condition, one or more signal quality values associated with the beam pair and the filtered signal quality from a measurement database.

By including or configuring the communications manager 820 in accordance with examples as described herein, the device 805 may support techniques for improved communication reliability, reduced latency, and improved coordination between devices. For example, the device 805 may be configured with one or more parameters to support improved blockage detection. By determining if there is a drop in signal quality of a reference signal that is at least a threshold amount below a filtered signal quality for at least a threshold time, the device 805 may detect a blockage quicker than if the device 805 does not use the threshold amount or threshold time period (e.g., if the device 805 uses filtered signal quality). The device 805 may reset a history of signal quality measurements and restart filtering after detecting the blockage, which may provide for a more accurate filtered signal quality level of the reference signal that accounts for the blockage. The device 805 may select a new receive beam or beam pair based on the reset filtered signal quality. Such techniques may provide for reduced latency, improved communication reliability, and improved coordination between the device 805 and another device in communication with the device 805.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of blockage detection for wireless communications as described herein, or the processor 840 and the memory 830 may be otherwise configured to perform or support such operations.

Figure 9:
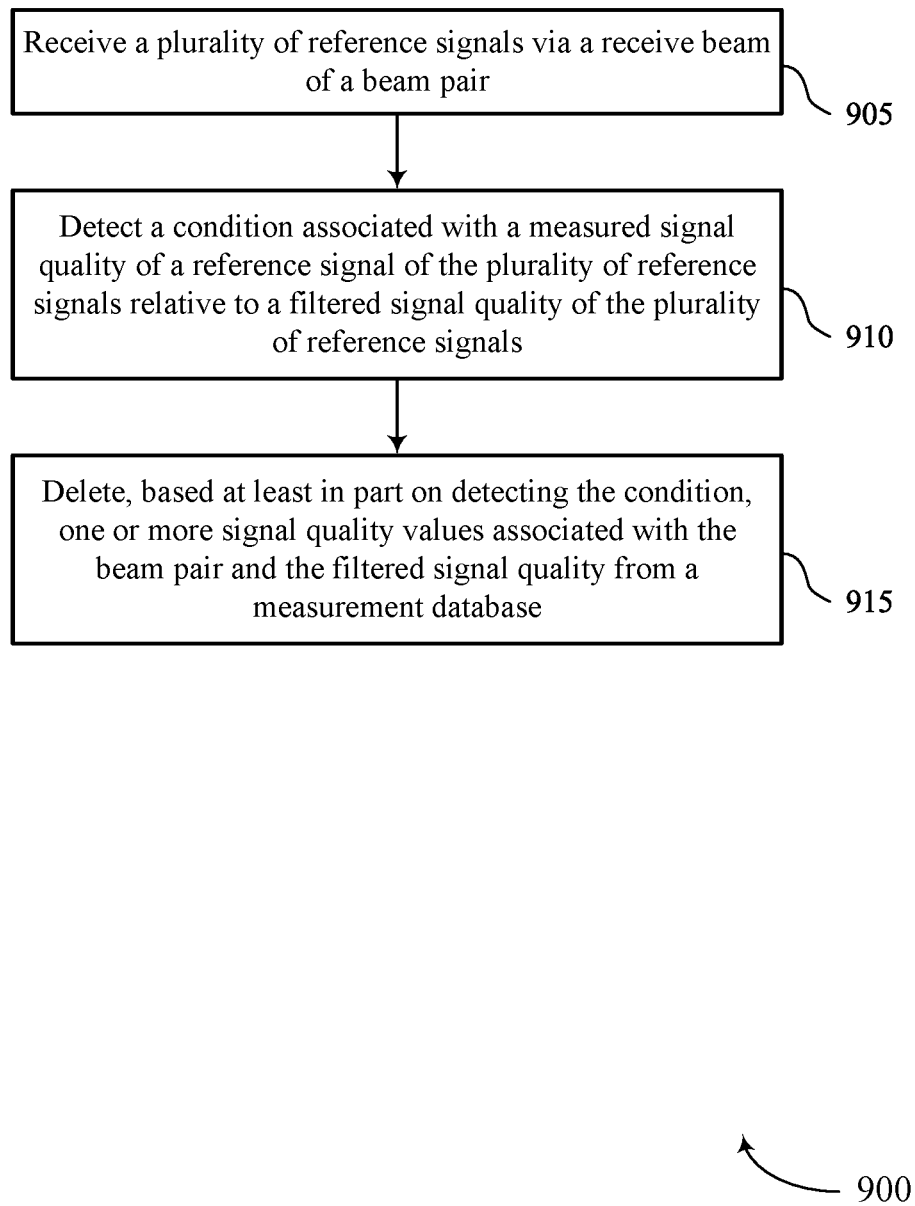
FIGS. 9 through 11 show flowcharts illustrating methods that support blockage detection for wireless communications in accordance with aspects of the present disclosure.

FIG. 9 shows a flowchart illustrating a method 900 that supports blockage detection for wireless communications in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a set of multiple reference signals via a receive beam of a beam pair. The operations of 905 may be performed in accordance with examples as disclosed herein. In some examples, aspects of the operations of 905 may be performed by a reference signal reception component 725 as described with reference to FIG. 7. Additionally or alternatively, means for performing 905 may, but not necessarily, include, for example, antenna 825, transceiver 820, communications manager 810, memory 830 (including code 835), processor 840 and/or bus 845.

At 910, the method may include detecting a condition associated with a measured signal quality of a reference signal of the set of multiple reference signals relative to a filtered signal quality of the set of multiple reference signals. The operations of 910 may be performed in accordance with examples as disclosed herein. In some examples, aspects of the operations of 910 may be performed by a condition detection component 730 as described with reference to FIG. 7. Additionally or alternatively, means for performing 910 may, but not necessarily, include, for example, antenna 825, transceiver 820, communications manager 810, memory 830 (including code 835), processor 840 and/or bus 845.

At 915, the method may include deleting, based on detecting the condition, one or more signal quality values associated with the beam pair and the filtered signal quality from a measurement database. The operations of 915 may be performed in accordance with examples as disclosed herein. In some examples, aspects of the operations of 915 may be performed by a measurement database component 735 as described with reference to FIG. 7. Additionally or alternatively, means for performing 915 may, but not necessarily, include, for example, antenna 825, transceiver 820, communications manager 810, memory 830 (including code 835), processor 840 and/or bus 845.

Figure 10:
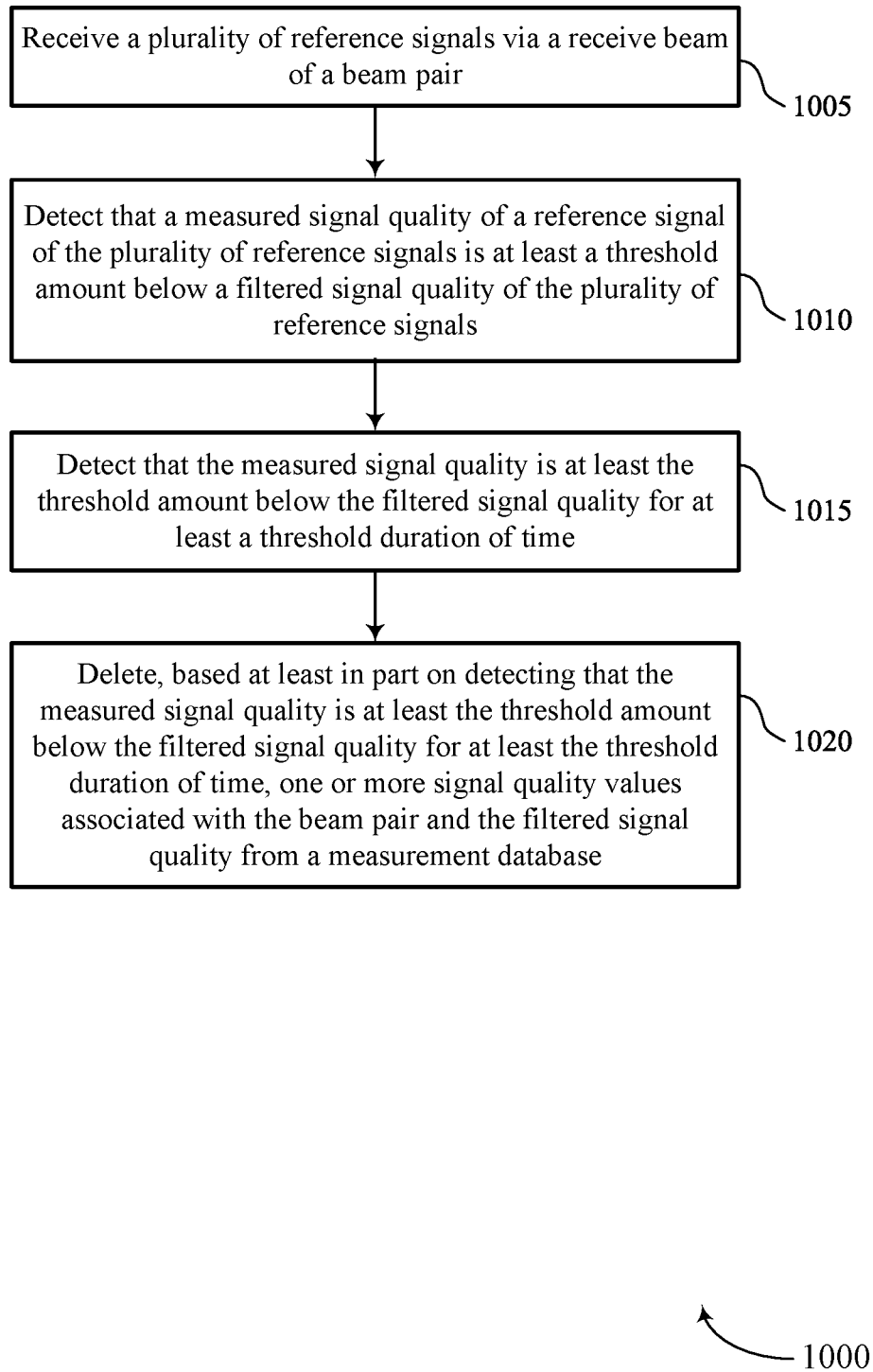

FIG. 10 shows a flowchart illustrating a method 1000 that supports blockage detection for wireless communications in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a set of multiple reference signals via a receive beam of a beam pair. The operations of 1005 may be performed in accordance with examples as disclosed herein. In some examples, aspects of the operations of 1005 may be performed by a reference signal reception component 725 as described with reference to FIG. 7. Additionally or alternatively, means for performing 1005 may, but not necessarily, include, for example, antenna 825, transceiver 820, communications manager 810, memory 830 (including code 835), processor 840 and/or bus 845.

At 1010, the method may include detecting that a measured signal quality of a reference signal of the set of reference signals is at least a threshold amount below a filtered signal quality of the set of reference signals. The operations of 1010 may be performed in accordance with examples as disclosed herein. In some examples, aspects of the operations of 1010 may be performed by a condition detection component 730 as described with reference to FIG. 7. Additionally or alternatively, means for performing 1010 may, but not necessarily, include, for example, antenna 825, transceiver 820, communications manager 810, memory 830 (including code 835), processor 840 and/or bus 845.

At 1015, the method may include detecting that the measured signal quality is at least the threshold amount below the filtered signal quality for at least a threshold duration of time. The operations of 1015 may be performed in accordance with examples as disclosed herein. In some examples, aspects of the operations of 1015 may be performed by a condition detection component 730 as described with reference to FIG. 7. Additionally or alternatively, means for performing 1015 may, but not necessarily, include, for example, antenna 825, transceiver 820, communications manager 810, memory 830 (including code 835), processor 840 and/or bus 845.

At 1020, the method may include deleting, based on detecting that the measured signal quality is at least the threshold amount below the filtered signal quality for at least the threshold duration of time, one or more signal quality values associated with the beam pair and the filtered signal quality from a measurement database. The operations of 1020 may be performed in accordance with examples as disclosed herein. In some examples, aspects of the operations of 1020 may be performed by a measurement database component 735 as described with reference to FIG. 7. Additionally or alternatively, means for performing 1020 may, but not necessarily, include, for example, antenna 825, transceiver 820, communications manager 810, memory 830 (including code 835), processor 840 and/or bus 845.

Figure 11:
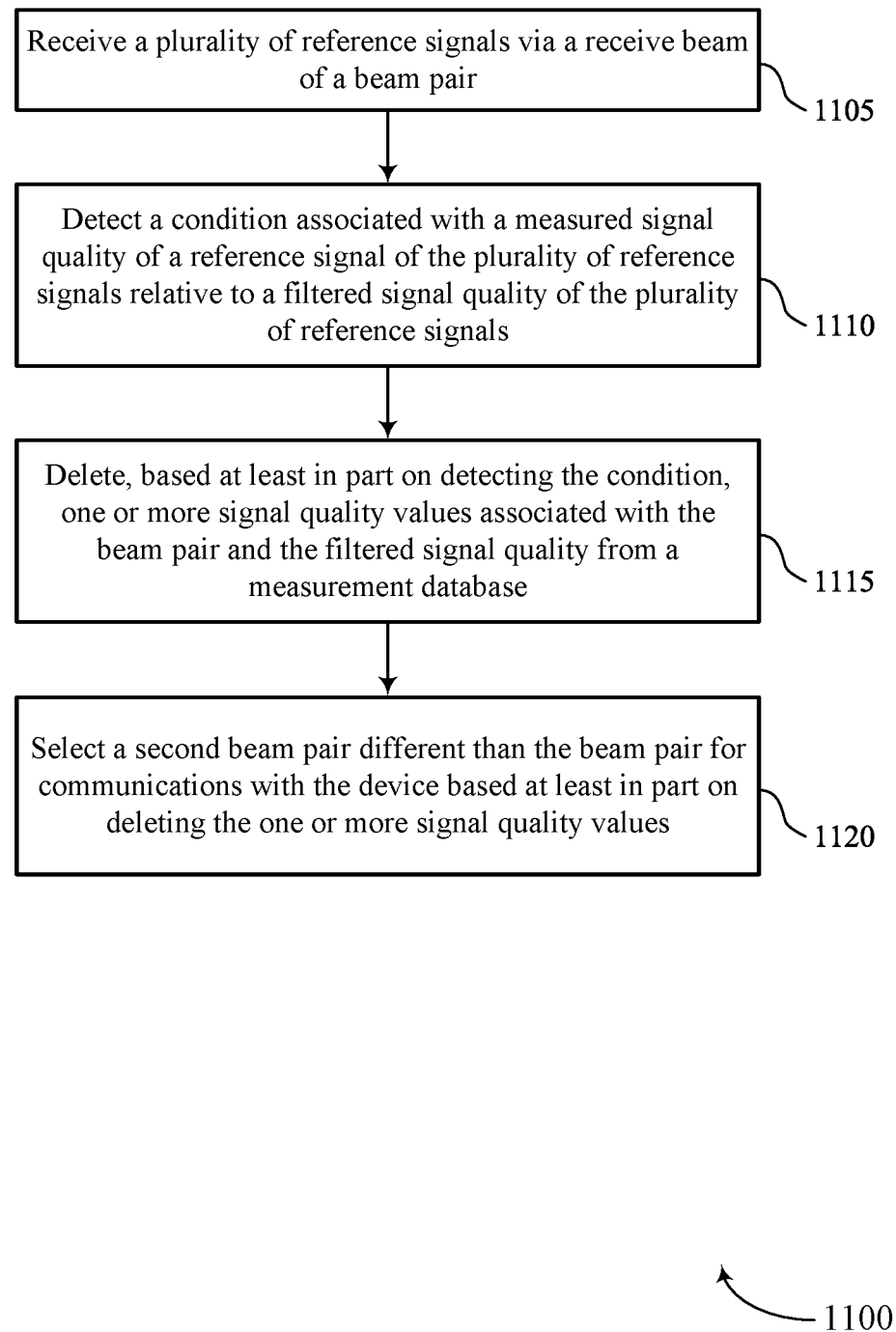

FIG. 11 shows a flowchart illustrating a method 1100 that supports blockage detection for wireless communications in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving a set of multiple reference signals via a receive beam of a beam pair. The operations of 1105 may be performed in accordance with examples as disclosed herein. In some examples, aspects of the operations of 1105 may be performed by a reference signal reception component 725 as described with reference to FIG. 7. Additionally or alternatively, means for performing 1105 may, but not necessarily, include, for example, antenna 825, transceiver 820, communications manager 810, memory 830 (including code 835), processor 840 and/or bus 845.

At 1110, the method may include detecting a condition associated with a measured signal quality of a reference signal of the set of multiple reference signals relative to a filtered signal quality of the set of multiple reference signals. The operations of 1110 may be performed in accordance with examples as disclosed herein. In some examples, aspects of the operations of 1110 may be performed by a condition detection component 730 as described with reference to FIG. 7. Additionally or alternatively, means for performing 1110 may, but not necessarily, include, for example, antenna 825, transceiver 820, communications manager 810, memory 830 (including code 835), processor 840 and/or bus 845.

At 1115, the method may include deleting, based on detecting the condition, one or more signal quality values associated with the beam pair and the filtered signal quality from a measurement database. The operations of 1115 may be performed in accordance with examples as disclosed herein. In some examples, aspects of the operations of 1115 may be performed by a measurement database component 735 as described with reference to FIG. 7. Additionally or alternatively, means for performing 1115 may, but not necessarily, include, for example, antenna 825, transceiver 820, communications manager 810, memory 830 (including code 835), processor 840 and/or bus 845.

At 1120, the method may include selecting a second beam pair different than the beam pair for communications with the device based on deleting the one or more signal quality values. In some examples, the second beam pair may include the transmit beam and a second receive beam that is different than the receive beam. Additionally or alternatively, the second beam pair may include a second transmit beam that is different than the transmit beam and a second receive beam that is different than the receive beam. The operations of 1120 may be performed in accordance with examples as disclosed herein. In some examples, aspects of the operations of 1120 may be performed by a beam pair selection component 745 as described with reference to FIG. 7. Additionally or alternatively, means for performing 1120 may, but not necessarily, include, for example, antenna 825, transceiver 820, communications manager 810, memory 830 (including code 835), processor 840 and/or bus 845.

The following provides an overview of aspects of the present disclosure:

Aspect 1: A method for wireless communication at a UE, comprising: receiving a plurality of reference signals via a receive beam of a beam pair; detecting a condition associated with a measured signal quality of a reference signal of the plurality of reference signals relative to a filtered signal quality of the plurality of reference signals; and deleting, based at least in part on detecting the condition, one or more signal quality values associated with the beam pair and the filtered signal quality from a measurement database.

Aspect 2: The method of aspect 1, wherein detecting the condition comprises: detecting that the measured signal quality is at least a threshold amount below the filtered signal quality.

Aspect 3: The method of aspect 2, wherein detecting the condition further comprises: detecting that the measured signal quality is at least the threshold amount below the filtered signal quality for at least a threshold duration of time.

Aspect 4: The method of aspect 3, further comprising: performing a plurality of measurements of the reference signal, wherein the threshold duration of time corresponds to a quantity of the plurality of measurements.

Aspect 5: The method of any of aspects 1 through 4, further comprising: performing a plurality of signal quality measurements prior to detecting the condition, wherein the one or more signal quality values are based at least in part on the plurality of signal quality measurements.

Aspect 6: The method of aspect 5, wherein the filtered signal quality is based at least in part on the plurality of signal quality measurements performed prior to detecting the condition.

Aspect 7: The method of any of aspects 5 through 6, wherein the plurality of signal quality measurements is associated with a plurality of receive beams associated with the UE and a transmit beam associated with a device in communication with the UE, the transmit beam included in the beam pair, and the plurality of receive beams comprising at least the receive beam of the beam pair.

Aspect 8: The method of any of aspects 5 through 6, wherein the plurality of signal quality measurements is associated with a plurality of receive beams associated with the UE and a plurality of transmit beams associated with a device in communication with the UE, the plurality of receive beams comprising the receive beam of the beam pair, and the plurality of transmit beams comprising a transmit beam of the beam pair.

Aspect 9: The method of any of aspects 1 through 8, wherein the beam pair comprises the receive beam and a transmit beam associated with a device in communication with the UE, the method further comprising: selecting a second beam pair different than the beam pair for communications with the device based at least in part on deleting the one or more signal quality values, the second beam pair comprising the transmit beam and a second receive beam that is different than the receive beam.

Aspect 10: The method of any of aspects 1 through 8, wherein the beam pair comprises the receive beam and a transmit beam associated with a device in communication with the UE, the method further comprising: selecting a second beam pair different than the beam pair for communications with the device based at least in part on deleting the one or more signal quality values, the second beam pair comprising a second transmit beam that is different than the transmit beam and a second receive beam that is different than the receive beam.

Aspect 11: The method of any of aspects 1 through 10, wherein the measured signal quality and the filtered signal quality each correspond to an RSRP value.

Aspect 12: The method of any of aspects 1 through 11, further comprising: transmitting a signal quality measurement report based at least in part on resetting the history, the signal quality measurement report comprising an updated filtered signal quality based at least in part on one or more signal quality measurements performed after deleting the one or more signal quality values.

Aspect 13: The method of any of aspects 1 through 12, wherein the measured signal quality comprises an instantaneous signal quality of the reference signal.

Aspect 14: An apparatus for wireless communication, comprising memory; a transceiver; at least one processor of a UE, the at least one processor coupled with the memory and the transceiver, and the at least one processor configured to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by at least one processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a plurality of reference signals via a receive beam of a beam pair;
   detecting a condition associated with a measured signal quality of a reference signal of the plurality of reference signals relative to a filtered signal quality of the plurality of reference signals; and
   deleting, based at least in part on detecting the condition, one or more signal quality values associated with the beam pair and the filtered signal quality from a measurement database.

2. The method of claim 1, wherein detecting the condition comprises:
   detecting that the measured signal quality is at least a threshold amount below the filtered signal quality.

3. The method of claim 2, wherein detecting the condition further comprises:
   detecting that the measured signal quality is at least the threshold amount below the filtered signal quality for at least a threshold duration of time.

4. The method of claim 3, further comprising:
   performing a plurality of measurements of the reference signal, wherein the threshold duration of time corresponds to a quantity of the plurality of measurements.

5. The method of claim 1, further comprising:
   performing a plurality of signal quality measurements prior to detecting the condition, wherein the one or more signal quality values are based at least in part on the plurality of signal quality measurements.

6. The method of claim 5, wherein the filtered signal quality is based at least in part on the plurality of signal quality measurements performed prior to detecting the condition.

7. The method of claim 5, wherein the plurality of signal quality measurements is associated with a plurality of receive beams associated with the UE and a transmit beam associated with a device in communication with the UE, the transmit beam included in the beam pair, and the plurality of receive beams comprising at least the receive beam of the beam pair.

8. The method of claim 5, wherein the plurality of signal quality measurements is associated with a plurality of receive beams associated with the UE and a plurality of transmit beams associated with a device in communication with the UE, the plurality of receive beams comprising the receive beam of the beam pair, and the plurality of transmit beams comprising a transmit beam of the beam pair.

9. The method of claim 1, wherein the beam pair comprises the receive beam and a transmit beam associated with a device in communication with the UE, the method further comprising:
   selecting a second beam pair different than the beam pair for communications with the device based at least in part on deleting the one or more signal quality values, the second beam pair comprising the transmit beam and a second receive beam that is different than the receive beam.

10. The method of claim 1, wherein the beam pair comprises the receive beam and a transmit beam associated with a device in communication with the UE, the method further comprising:
    selecting a second beam pair different than the beam pair for communications with the device based at least in part on deleting the one or more signal quality values, the second beam pair comprising a second transmit beam that is different than the transmit beam and a second receive beam that is different than the receive beam.

11. The method of claim 1, wherein the measured signal quality and the filtered signal quality each correspond to a reference signal received power value.

12. The method of claim 1, further comprising:
    transmitting a signal quality measurement report based at least in part on deleting the one or more signal quality values, the signal quality measurement report comprising an updated filtered signal quality based at least in part on one or more signal quality measurements performed after deleting the one or more signal quality values.

13. The method of claim 1, wherein the measured signal quality comprises an instantaneous signal quality of the reference signal.

14. An apparatus for wireless communication, comprising:
    memory;
    a transceiver; and
    at least one processor of a user equipment (UE), the at least one processor coupled with the memory and the transceiver, and the at least one processor configured to cause the apparatus to:
       receive, via the transceiver, a plurality of reference signals via a receive beam of a beam pair;
       detect a condition associated with a measured signal quality of a reference signal of the plurality of reference signals relative to a filtered signal quality of the plurality of reference signals; and
       delete, based at least in part on detecting the condition, one or more signal quality values associated with the beam pair and the filtered signal quality from a measurement database.

15. The apparatus of claim 14, wherein, to detect the condition, the at least one processor is configured to:
    detect that the measured signal quality is at least a threshold amount below the filtered signal quality.

16. The apparatus of claim 15, wherein, to detect the condition, the at least one processor is configured to:
    detect that the measured signal quality is at least the threshold amount below the filtered signal quality for at least a threshold duration of time.

17. The apparatus of claim 16, the at least one processor further configured to:
    perform a plurality of measurements of the reference signal, wherein the threshold duration of time corresponds to a quantity of the plurality of measurements.

18. The apparatus of claim 14, the at least one processor further configured to:
    perform a plurality of signal quality measurements prior to detecting the condition, wherein the one or more signal quality values are based at least in part on the plurality of signal quality measurements.

19. The apparatus of claim 18, wherein the filtered signal quality is based at least in part on the plurality of signal quality measurements performed prior to detecting the condition.

20. The apparatus of claim 18, wherein the plurality of signal quality measurements is associated with a plurality of receive beams associated with the UE and a transmit beam associated with a device in communication with the UE, the transmit beam included in the beam pair, and the plurality of receive beams comprising at least the receive beam of the beam pair.

21. The apparatus of claim 18, wherein the plurality of signal quality measurements is associated with a plurality of receive beams associated with the UE and a plurality of transmit beams associated with a device in communication with the UE, the plurality of receive beams comprising the receive beam of the beam pair, and the plurality of transmit beams comprising a transmit beam of the beam pair.

22. The apparatus of claim 14, wherein the beam pair comprises the receive beam and a transmit beam associated with a device in communication with the UE, and wherein the at least one processor is further configured to:
  select a second beam pair different than the beam pair for communications with the device based at least in part on deleting the one or more signal quality values, the second beam pair comprising the transmit beam and a second receive beam that is different than the receive beam.

23. The apparatus of claim 14, wherein the beam pair comprises the receive beam and a transmit beam associated with a device in communication with the UE, and wherein the at least one processor is further configured to:
  select a second beam pair different than the beam pair for communications with the device based at least in part on deleting the one or more signal quality values, the second beam pair comprising a second transmit beam that is different than the transmit beam and a second receive beam that is different than the receive beam.

24. The apparatus of claim 14, wherein the measured signal quality and the filtered signal quality each correspond to a reference signal received power value.

25. The apparatus of claim 14, the at least one processor further configured to:
  transmit, via the transceiver, a signal quality measurement report based at least in part on deleting the one or more signal quality values, the signal quality measurement report comprising an updated filtered signal quality based at least in part on one or more signal quality measurements performed after deleting the one or more signal quality values.

26. The apparatus of claim 14, wherein the measured signal quality comprises an instantaneous signal quality of the reference signal.

27. An apparatus for wireless communication at a user equipment (UE), comprising:
  means for receiving a plurality of reference signals via a receive beam of a beam pair;
  means for detecting a condition associated with a measured signal quality of a reference signal of the plurality of reference signals relative to a filtered signal quality of the plurality of reference signals; and
  means for deleting, based at least in part on detecting the condition, one or more signal quality values associated with the beam pair and the filtered signal quality from a measurement database.

28. The apparatus of claim 27, wherein the means for detecting the condition comprise:
  means for detecting that the measured signal quality is at least a threshold amount below the filtered signal quality.

29. The apparatus of claim 28, wherein the means for detecting the condition further comprise:
  means for detecting that the measured signal quality is at least the threshold amount below the filtered signal quality for at least a threshold duration of time.

30. A non-transitory computer-readable medium storing code for wireless communication at a user equipment (UE), the code comprising instructions executable by at least one processor to:
  receive a plurality of reference signals via a receive beam of a beam pair;
  detect a condition associated with a measured signal quality of a reference signal of the plurality of reference signals relative to a filtered signal quality of the plurality of reference signals; and
  delete, based at least in part on detecting the condition, one or more signal quality values associated with the beam pair and the filtered signal quality from a measurement database.

* * * * *